United States Patent Office 2,767,300
Patented Oct. 16, 1956

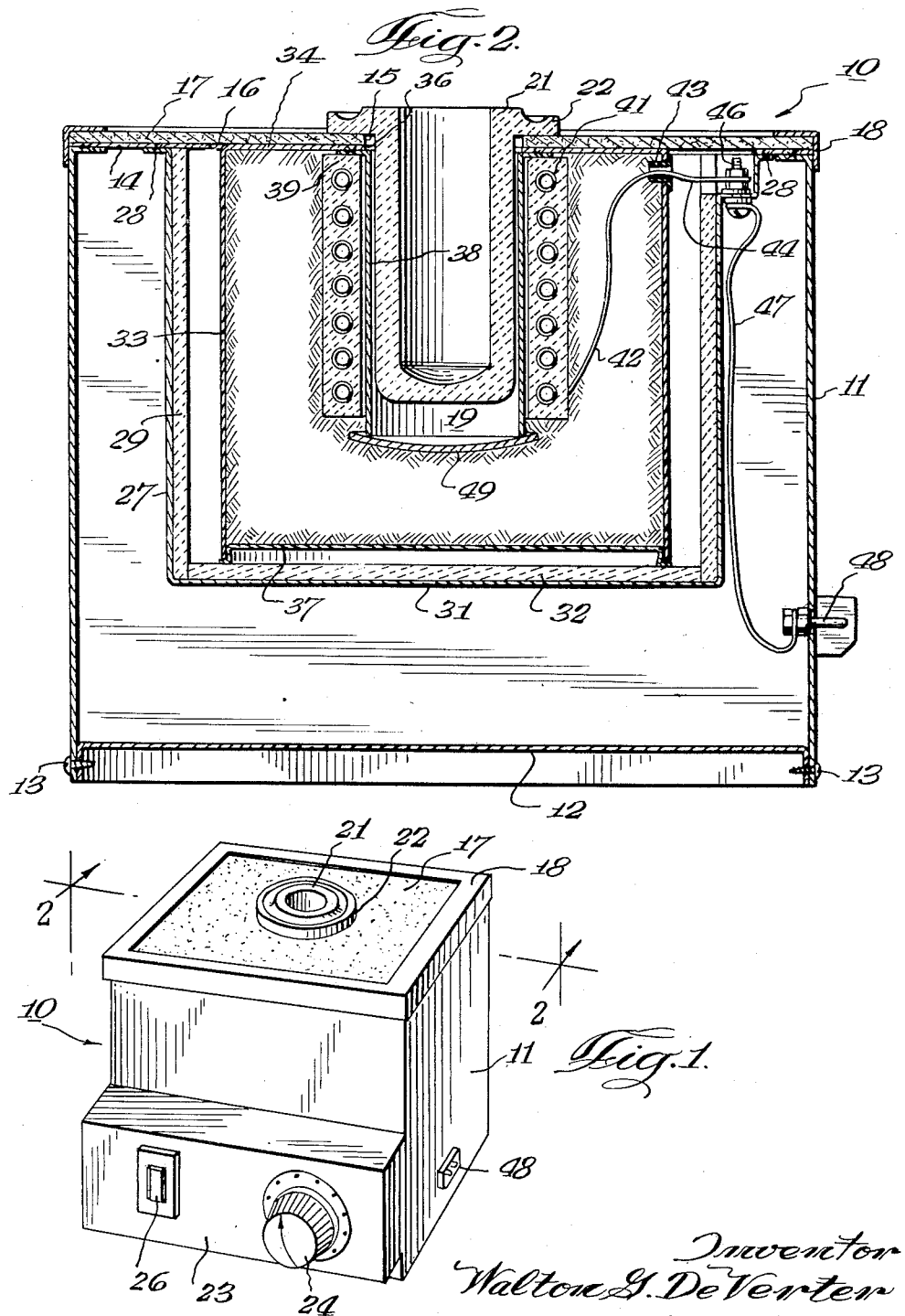

2,767,300

ELECTRICAL SOLDERING POT

Walton G. De Verter, Chicago, Ill.

Application May 7, 1954, Serial No. 428,315

3 Claims. (Cl. 219—44)

This invention relates generally to melting pots for solder or the like, and more particularly to an improved pot capable of withstanding the corrosive fluxes as may be found in silver soldering.

The presence in silver soldering of corrosive fluxes, such as borates and fluorides, causes the ceramic crucible employed to have an extremely short usable life, and moreover, such fluxes have caused damage to the electric element for heating the crucible. The problem of ready replacement of the crucible and the isolation of such fluxes from the heating element has not heretofore been readily solved, and moreover, in such cases where the heating element is isolated from such fluxes, replacement thereof has not been readily possible.

According to the present invention the ceramic crucible is isolated from the heating element through the medium of a stage made of heat resistant sheet material such as asbestos, said sheet material overlaying a receptacle having a top opening in register with a similar opening in the sheet material. The top opening in such receptacle is provided with a cylindrical well, made of heat-resistant metal, which is surrounded by a heating element. The ceramic crucible extends down into the well and is supported from the crucible flange by the asbestos sheet material. The receptacle rests upon a closure formed at the bottom thereof, and the receptacle may readily be removed from its support whenever replacement of the heating element is necessary.

It is a principal object of this invention to provide an improved melting pot characterized by isolation of corrosive fluxes from an electric heating element of such melting pot.

A further object is to provide in an electrical soldering pot or the like a construction for the convenient replacement of the heating element, or the crucible.

An ancillary object of the invention is to provide a ceramic crucible which will be exceedingly resistant to the corrosion from the fluxes found in silver soldering.

Other objects and important features of the invention will be apparent from a study of the specification following taken with the drawings which together describe and illustrate a preferred embodiment of the invention and what is now considered to be the best mode of practicing the principles thereof. Other embodiments of the invention may be suggested to those having the benefit of the teachings herein, and it is therefore intended that the invention not be limited by the precise embodiment herein shown, such other embodiments being expressly reserved as they may fall within the purview of the claims subjoined.

In the drawing:

Fig. 1 is a perspective view of a melting pot constructed in accordance with the present invention; and Fig. 2 is an enlarged vertical section taken along the plane 2—2 of Fig. 1 looking in the direction of the arrows.

Referring now to the drawing, the improved electrical soldering pot according to the present invention is referred to generally by the reference numeral 10, and includes an outer walled housing 11 having a bottom closure 12 secured thereto by self-tapping screws 13 or the like.

As seen in Fig. 1, the soldering pot is essentially cubical in shape, but it may be cylindrical in form if desired. The housing 11 includes a top stage 14 having a circular opening 16 therein. The top stage 14 is overlaid by a sheet of heat-resisting material 17, made of asbestos or the like, which is held in position atop the housing 11 by means of a generally rectangular ferrule or cap 18.

The pot 10 has a well 19 which will be described in greater detail as this specification proceeds, into which a ceramic crucible 21 extends. A flange 22 is formed on the crucible 21 so as to overlie the sheet of asbestos material 17 thereby supporting the crucible 21.

As seen in Fig. 1, the melting pot 10 has a front panel 23 affording a support for a temperature control 24 adjusting the temperature of the contents of the crucible 21, and a signal lamp 26 indicating to the user the fact that the energy is being supplied to the pot 10.

Referring now again to Fig. 2, the top stage 14 supports from the underside thereof a cylindrical receptacle 27 having flanges 28, whereby the receptacle 27 may be spot-welded to the underside of the stage 14. The cylindrical wall of the receptacle 27 is lined with heat insulating material 29, and the bottom 31 thereof is likewise lined with a sheet of insulating material 32. The lined receptacle 27 affords a support for an inner nesting receptacle 33 having a top surface 34 with a circular opening 36 therein in register with the opening 15 in the sheet 17.

The inner receptacle 33 has a bottom friction-type closure 37 resting upon the pad 32. The vertical dimension of the inner receptacle 33 is such that when resting upon the pad 32, the top surface 34 thereof lies substantially in the plane of the top stage 14, so as to present a substantially unbroken surface for the sheet of heat-resistant material 17.

A cylindrical well 38 has a flange 39 which is spot-welded to the underside of the top 34 of the inner receptacle 33, said well 38 being in register with the opening 36 and 15. A cylindrical heating element 41 surrounds the well 38 and is isolated from the crucible 21 by the well 38, being similarly isolated from any flux escaping from the top of the crucible 21 and around the flange 22 and the asbestos material 17.

The well 38 may be made of an extremely corrosion-resistant stainless steel or the like. However, such a liner may be made of an alloy consisting of 80% nickel and 20% chromium. Such an alloy has been found to be extremely corrosion resistant.

A pair of power leads 42 pass through a grommet 43 adjacent the upper part of the receptacle 33, and are provided with terminals to be connected to terminals 46 in a recessed portion of the receptacle 27. Power leads 47 are connected to the terminals 46 and lead to a male fitting 48 in the side wall of the outer housing 11.

As seen in Fig. 2, the lower end of the well 38 is closed by a disc 49, and the interior of the receptacle 33 is packed with heat insulating material such as fuller's earth, kieselguhr, diatomaceous earth or the like.

The assembly of the structure according to the present invention is believed clear from the foregoing description. However, for purposes of clarity, the inner receptacle 33 is assembled in the following manner:

The inner receptacle 33 is placed in an inverted position with the closure 37 removed therefrom. The cylindrical heating element 41 is then slipped over the sleeve 38 and the disc 49 placed in position. The inner receptacle 33 is then packed with the insulating earth described and the closure 37 pressed into position. The inner receptacle 33 is then reversed in position with the closure 37 resting upon the sheet of insulating material 32, and the sheet of heat-resisting material 17 placed thereover, the crucible 21 then being placed in position in the well 19 provided by the sleeve 38.

It will be apparent that the crucible 21 may readily be replaced at the end of its life span. A ceramic crucible having as a constituent thereof chromium sesquioxide has been found to be extremely resistant to fluorides and borates used in silver soldering. In fact, the addition of such oxide to any basic ceramic seems to make it resistant to hydrofluoric acid and other fluorides. A typical formulation for such crucible having the corrosion-resistant feature may be as follows:

| | Percent |
|---|---|
| Zirconium silicate | 79 |
| #4 clay | 15 |
| Chromium sesquioxide | 5 |
| Lithium citrate | 1 |

It will also be apparent that the provision of the flange 22 thereon and the corrosion-resistant sleeve 38 and its flange 39 prevents the movement of damaging flux to the heating element 41. Likewise, it will be apparent that the heating element may be replaced at the end of its useful life by a similar sequence of operations as described.

While the invention has been described in terms of a preferred embodiment thereof, it is not intended that it be limited by the embodiment so described, nor otherwise by the terms of the claims here appended.

I claim as my invention:

1. In a melting pot, a support receptacle having an open top, said receptacle being lined with a heat insulation material, a second receptacle nested within said first support receptacle so its top is flush with said open top, said second receptacle being of sheet metal and having a closed top provided with a cylindrical recess closed at its bottom, said cylindrical recess being surrounded on its exterior with a heating element, said second receptacle being filled with heat insulation material, a closure for the bottom of said second receptacle, a heat insulation sheet of material extending across both said receptacles and having an opening coincident with said cylindrical recess, and a crucible having a flange engaging said sheet of material to support said crucible within said recess in depending manner.

2. In a melting pot, a support receptacle having an open top, said receptacle being lined with a heat insulation material, a second receptacle nested within said first support receptacle so its top is flush with said open top, said second receptacle being of sheet metal and having a closed top provided with a central cylindrical well, said cylindrical well being surrounded on its exterior with a heating element, said second receptacle being filled with heat insulation material, a heat insulation sheet of material extending across the tops of both said receptacles and having an opening coincident with said cylindrical well, and a crucible having a flange engaging said sheet of material to support said crucible within said well.

3. In a melting pot, a support receptacle having an open top, said receptacle being lined with heat insulation material, a second receptacle nested within said first support receptacle so its top is flush with said open top, said second receptacle being of sheet metal and having a closed top provided with a central cylindrical well formed of corrosion resistant material, said cylindrical well being surrounded within said second receptacle with a heating element, said second receptacle being filled with heat insulation material, a closure for the bottom of said second receptacle, a heat insulating sheet of material extending across the tops of said receptacles and having an opening coincident with said cylindrical well, and a crucible having a flange resting on said sheet of material to suspend said crucible within said well.

References Cited in the file of this patent

UNITED STATES PATENTS

| 1,027,739 | Lauzon | May 28, 1912 |
| 1,394,954 | Aller | Oct. 25, 1921 |
| 1,745,455 | Seaborn | Feb. 4, 1930 |
| 1,998,084 | James | Apr. 16, 1935 |
| 2,190,135 | Morgan | Feb. 13, 1940 |
| 2,218,584 | McDougal | Oct. 22, 1940 |
| 2,440,187 | Silverberg | Apr. 20, 1948 |

FOREIGN PATENTS

| 504,000 | Germany | July 28, 1930 |